US006201363B1

(12) United States Patent
Miyazawa

(10) Patent No.: US 6,201,363 B1
(45) Date of Patent: Mar. 13, 2001

(54) POWER WINDOW APPARATUS

(75) Inventor: Noriyuki Miyazawa, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,502

(22) Filed: Nov. 19, 1999

(30) Foreign Application Priority Data

Nov. 20, 1998 (JP) ............................................... 10-330701

(51) Int. Cl.[7] ............................... B60J 1/00; B60R 16/02

(52) U.S. Cl. .......................... 318/283; 318/286; 318/483; 307/10.1

(58) Field of Search .................................... 318/280, 283, 318/286, 293, 466, 468, 483; 307/9.1, 10.1, 112, 113

(56) References Cited

U.S. PATENT DOCUMENTS 5,547,208 * 8/1996 Chappell et al. .................... 180/281
5,994,797 * 11/1999 Yamaoka ............................. 307/125
6,031,296 * 2/2000 Takagi et al. ....................... 307/10.1
6,060,794 * 5/2000 Takagi et al. ....................... 307/125
6,072,290 * 6/2000 Takagi et al. ....................... 318/283
6,081,085 * 6/2000 Ohashi et al. ....................... 318/283
6,111,373 * 8/2000 Ohashi ................................ 318/265

* cited by examiner

*Primary Examiner*—Bentsu Ro
(74) *Attorney, Agent, or Firm*—Smith, Gambrell & Russell, LLP

(57) ABSTRACT

A power window apparatus for a vehicle capable of switching an operation mode of a window to a submersion mode when a submersion of the vehicle is detected, includes a circuit board for controlling the window, a sensor having a pair of electrodes for detecting a continuity between the electrodes when the electrodes are submerged, a housing for accommodating the circuit board and the sensor, a first chamber provided in the housing and enclosed by walls for accommodating the circuit board, a second chamber provided in the housing and enclosed by walls for accommodating the sensor, and an opening provided at the walls of the second chamber for allowing to introduce water into the second chamber so as to merge the sensor in water before the circuit board is submerged.

16 Claims, 3 Drawing Sheets

POWER WINDOW APPARATUS

BACKGROUND OF THE INVENTION

1. Field of the Invention

The present invention relates to a power window apparatus for a vehicle, and more particularly, to a power window apparatus securing a window opening operation when the vehicle is submerged.

2. Background Art

An increasing number of vehicles are equipped with a power window apparatus capable of raising and lowering side windows by electric motors. Generally, the power window operating mechanism comprises an electric motor, a window raising relay controlled by a window raising switch and a window lowering relay controlled by a window lowering switch. The electric motor is electrically energized or deenergized by the operations of the window raising or lowering relays to open or close the window.

According to the prior art, when a vehicle is submerged accidentally, water enters into switches and sometimes the switches may be in an energized condition irrespective of whether or not an operator operates a switch or sometimes a control device for controlling the window may output unexpected signals. Specifically, for example, when the vehicle is submerged, there is a possibility that the window closes or will not open despite the operator's intention to open the window.

SUMMARY OF THE INVENTION

It is an object of the present invention to provide a power window apparatus capable of opening the window even when relative circuits of the apparatus are under water.

To this object, a power window apparatus for a vehicle capable of switching an operation mode of a window to a submersion mode when a submersion of the vehicle is detected, comprises a circuit board for controlling the window, at least one sensor having a pair of electrodes for detecting a continuity therebetween when the electrodes are submerged, a housing for accommodating the circuit board and the sensor, a first chamber provided in the housing and enclosed by walls for accommodating the circuit board, a second chamber provided in the housing and enclosed by walls for accommodating the sensor, and at least one opening provided at the walls of the second chamber for allowing to introduce water into the second chamber so as to merge the sensor in water before the circuit board is submerged.

DESCRIPTION OF THE PREFERRED EMBODIMENTS

Figure 1:
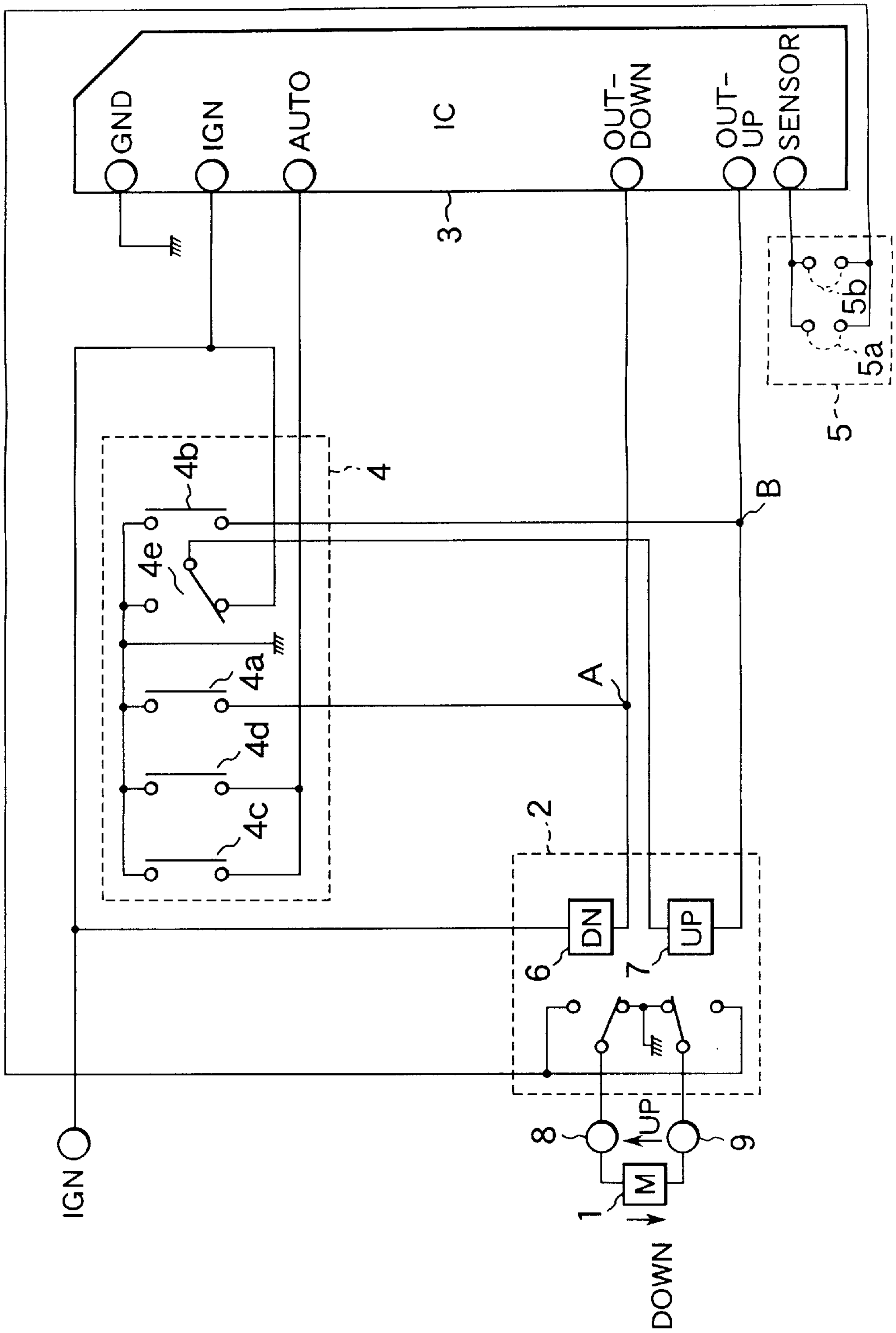
FIG. 1 is a schematic circuit diagram showing an input/output part of a power window apparatus according to the present invention.

Referring now to FIG. 1, this input/output circuit is relative to a power window apparatus for actuating a single side window glass on a driver side. The power window apparatus comprises a drive motor 1, a relay section 2, a control section 3, a switch section 4 and a submersion sensor section 5. In the drawing, a symbol IGN denotes an ignition terminal to which an ignition voltage (for example, 12 volts) is fed from a battery (not shown) through an ignition switch (not shown).

The drive motor 1 is a power source for raising and lowering the window and is controlled by the relay section 2 so as to rotate in a normal direction, in a reverse direction or to stop. The relay section 2 comprises a down relay 6 and an up relay 7. The down relay 6 and up relay 7 are connected with a ground terminal, when coils of these relays are deenergized and as a result voltages of terminals 8, 9 are in ground level (0 volt) respectively. Therefore, in this case, the drive motor 1 is in standstill. When either of these coils of the relays 6, 7 is energized, the relay on the energized side switches over its terminal from the ground side to the IGN terminal side. As a result, the drive motor 1 is rotated in a normal or reverse direction by the potential difference generated between the terminals 8, 9. Further, when both coils of the relays 6, 7 are energized, both relays are switched over to the IGN terminal side. As a result, the drive motor 1 does not rotate because no potential difference is generated between the terminals 8, 9.

The control section 3 is formed by a single or a plurality of ICs (Integrated circuits) which are integrated by a lot of electronic devices such as transistors, resistors and capacitors. In the control section 3, calculations are carried out according to signals inputted to respective input terminals of the IC and the results of the calculations are outputted to the output terminal of the IC. The control section 3 has a plurality of terminals, namely, a GND terminal grounded, an IGN terminal to which the IGN voltage is supplied, an AUTO terminal to which ground potential is supplied only when an auto mode for raising or lowering the window automatically is instructed by a switch, an OUT-DOWN terminal which is connected to a node A connected to an end of a coil of the down relay 6 and which outputs signals for controlling the down relay 6, an OUT-UP terminal which is connected to a node B connected to an end of a coil of the up relay 7 and which outputs signals for controlling the up relay 7 and a SENSOR terminal to which a detection signal of the submersion sensor 5 is inputted. The circuit constituting the control section 3 has so high impedance characteristic that there is a possibility of causing erroneous operations when the vehicle is submerged.

The switch section 4 comprises four switches 4*a,* 4*b,* 4*c* and 4*d* which are switched over by the operation of a driver and an up-relay switch 4*e.* The switch 4*a* is turned ON when a window raising and lowering switch knob is pushed and also the switch 4*c* is turned ON when the switch knob is pushed with a stroke larger than specified (on AUTO-DOWN mode) . On the other hand, the switch 4*b* is turned ON when the switch knob is pulled and also the switch 4*d* is turned ON when the switch knob is pulled with a stroke larger than specified (on AUTO-UP mode). The switches 4*a,* 4*b,* 4*c* and 4*d* are grounded at one end thereof, respectively. The other end of the switch 4*a* is connected with the node A and the other end of the switch 4*b* is connected with the node B. Further, the switches 4*c* and 4*d* are connected at the other ends thereof with the AUTO terminal of the control section 3, respectively. The up-relay switch 4*e,* at an initial stage, connects the other end of the coil of the up-relay 7 and the IGN terminal and only on the AUTO-DOWN mode it is switched over from the IGN terminal side to the ground side being interlocked with the operation of the switch knob.

The submersion sensor section 5 comprises two sensors 5*a* an 5*b* having a pair of conductive elements arranged adjacent to each other, respectively. The respective sensors 5*a*, 5*b* are connected at one terminal thereof with the IGN terminal and at the other terminal thereof with the SENSOR terminal of the control section 3. The two sensors 5*a*, 5*b* are disposed at different positions with respect to the longitudinal direction of the vehicle. The sensor 5*a* is disposed on the front side and the sensor 5*b* is disposed on the rear side. When the vehicle is submerged, the resistance between the conductive elements is lowered due to the water coming therebetween and as a result current passes through the conductive elements. Specifically, in case where the front side first sinks in water, the sensor 5*a* on the front side has continuity earlier than the sensor 5*a* on the rear side. On the other hand, in case where the rear side first sinks in water, the sensor 5*b* on the rear side has continuity earlier than the sensor 5*a* on the front side. The potential of the sensor terminal goes up and it is possible to detect whether or not the vehicle is submerged. The reason why a plurality of sensors are arranged at different positions of the vehicle is that it is necessary to recognize the submersion of the vehicle before the control section 3 is submerged and the window becomes inoperative. Since the control section 3 has a high impedance characteristic, the submerged control section 3 disables the operation of the window.

The operation of the circuit shown in FIG. 1 will be described with respect to a normal state, namely, a state where the vehicle is not submerged.

On a MANUAL-DOWN mode, that is, when the window raising and lowering switch knob is pushed toward the lowering side with a stroke smaller than specified, the switch 4*a* is turned ON and the node A is grounded. As a result, a potential difference generates between both ends of the coil of the down-relay 6, the down-relay 6 is switched over from the ground side to the IGN terminal side and the IGN voltage is supplied to the terminal 8. In this case, since the up-relay 7 is held on the ground side as initially set, the terminal 9 is kept grounded. Accordingly, the voltage difference between the terminals 8 and 9 rotates the drive motor 1 in the normal direction and as a result the window is lowered. On a MANUAL-UP mode, that is, when the switch knob is pushed toward the raising side with a stroke smaller than specified, the switch 4*b* is turned ON and the node B is grounded. As a result, a potential difference generates between both ends of the coil of the up-relay 7, the up-relay 7 is switched over from the ground side to the IGN terminal side and the IGN voltage is supplied to the terminal 9. In this case, since the down-relay 6 is held on the ground side as initially set, the terminal 8 is kept grounded. Accordingly, the voltage difference between the terminals 8 and 9 rotates the drive motor 1 in the reverse direction and as a result the window is raised.

On the other hand, on an AUTO-DOWN mode, namely, when the switch knob is pushed toward the lowering side with a stoke larger than specified, first the up-relay switch 4*e* is switched over to the ground side. Then, the switches 4*a*, 4*c* are turned ON and the AUTO terminal of the control section 3 is grounded. When the AUTO terminal is grounded, the control section 3 makes the OUT-DOWN terminal ground and the potential of the node A is established at the ground level. After the operation of the switch knob is released and the switches 4*a*, 4*c* are turned OFF, the potential of the node A is kept at the ground level and accordingly the drive motor 1 continues to be rotated in the normal direction so as to lower the window automatically. Further, on an AUTO-UP mode, the switches 4*b*, 4*d* are turned ON and the AUTO terminal of the control section 3 is grounded. Then, the control section 3 makes the OUT-UP terminal ground and the potential of the node B is established at the ground level. Since this state is continued even after the switches 4*b*, 4*d* are turned OFF, the drive motor 1 is rotated in the reverse direction to raise the window automatically.

Next, the operation when the vehicle is submerged will be described.

When the vehicle is submerged and the sensor section 5 is under water, the potential of the SENSOR terminal of the control section 3 increases. According to this change of the potential, the operation mode of the window is established at a submersion mode. In the submersion mode, the control section 3 establishes both of the OUT-DOWN and OUT-UP terminals at the ground level simultaneously. As a result, the potentials of the node A and node B are established at the ground level. Since the up-relay switch 4*e* is connected to the IGN terminal side, both coils of the down-relay 6 and up-relay 7 are electrically energized and both relays 6, 7 are changed over to the IGN terminal side. As a result, both terminals 8, 9 are set to the IGN voltage. However, since there is no potential difference between both terminals 8, 9, the drive motor 1 is inoperative and is in standstill. On any modes of MANUAL-DOWN, MANUAL-UP OR AUTO-UP, since this state is maintained, the drive motor 1 is inoperative.

However, only in case where the AUTO-DOWN mode is established, the window can be lowered. On the AUTO-DOWN mode, as describe before, that is, when both switches 4*a*, 4*c* are turned ON, the up-relay switch 4*e* is switched over from the IGN terminal side to the ground side being interlocked with this operation. Since the node B has been established at the ground level when the vehicle is submerged, the up-relay 7 is changed over from the IGN terminal side to the ground terminal side. As a result, the terminal 9 is switched to the ground level. At this moment, since the down-relay 6 is still maintained at the IGN voltage, the terminal 8 is also held at the IGN voltage. As a result, a potential difference generates between the terminals 8, 9 and the drive motor 1 is rotated in the normal direction to lower the window. On the other hand, the switch 4*c* (or both switches 4*a*, 4*c*) is turned OFF and the AUTO-DOWN mode is released, the up-relay switch 4*e* is switched over from the ground terminal side to the IGN terminal side, thereby the drive motor 1 comes to standstill to stop lowering the window.

Figure 2:
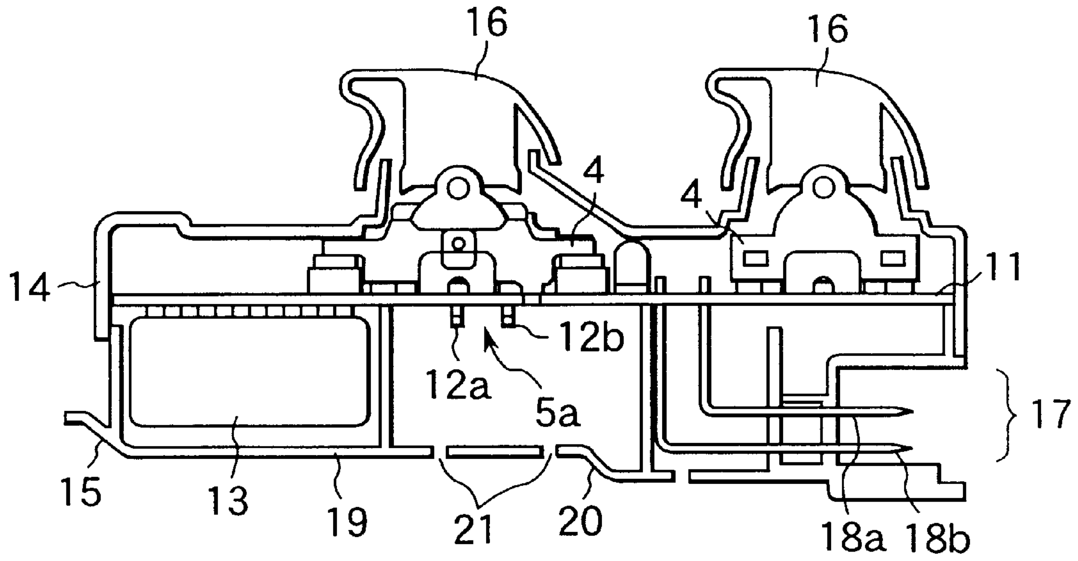
FIG. 2 is a cross sectional view showing a structure of a housing for accommodating a power window apparatus according to a first embodiment.

FIG. 2 is a cross sectional view showing a structure of a housing of the power window apparatus according to the first embodiment. There are provided a switch section 4 and electronic components such as resistors, capacitors and the like on a printed board 11. Further, a pair of electrodes 12*a*, 12*b* constituting a sensor 5*a* are formed on the bottom surface of the printed board 11. The space between the electrodes 12*a*, 12*b* is established to such a space that electric current flows between the electrodes 12*a*, 12*b* when this portion is submerged. In FIG. 2, only one sensor 5*a* is illustrated, however, another sensor 5*b* is disposed in a different position on the bottom surface of the printed board 11. For instance, the sensor 5*a* is provided at the front part of the vehicle and the sensor 5*b* is provided at the rear part of the vehicle.

Another printed board 13 is provided on the bottom surface of the printed board 11. The printed board 13 is provided with a driver IC and is fixed to the printed board 11 in a perpendicular relationship with the printed board 11 by means of soldering and the like. Circuit elements on the board 11 are electrically connected with the driver IC.

The printed board 11 is caught by an upper housing 14 and a lower housing 15 which are secured to each other using screws or claws to form an integral body. A switch knob 16 is provided on the upper housing 14. Respective switches 4*a*, 4*d*, 4*e* constituting the switch section 4 are switched over by operating the switch knob 16. A connector 17 having two terminals 18*a*, 18*b* is provided on the right side of the lower housing. The switch section 2 and the driver IC are electrically connected with the relay section 2 through a connector connected to the connector section 17.

The printed board 13 is accommodated in a first chamber formed by a part of the printed board 11 and a part of the lower housing 15 integrally formed by a bottom wall 19 and surrounding four vertical walls thereof. Similarly, the pair of electrodes 12*a*, 12*b* constituting the sensor 5*a* is accommodated in a second chamber formed by a part of the printed board 11 and a part of the lower housing 15 integrally formed by a bottom wall 20 and surrounding four vertical walls thereof. The bottom wall 20 has a plurality of holes 21.

Considering a process of a vehicle sinking in water, the water level rises from the lower part of the vehicle and reaches the bottom walls 19, 20 of the lower housing 15. Since the bottom wall 20 has the holes 21, water enters into the second chamber through the holes but does not into the first chamber in which the board 13 is accommodated. As a result, the electrodes 12*a*, 12*b* has a continuity therebetween due to the incoming water before the driver IC on the printed board 13 is submerged. The continuity provides the SENSOR terminal of the control section 3 shown in FIG. 1 with a rise in potential, thereby the control section detects that the vehicle is sinking into water. When the sinking state is detected, as described before, two relays 6, 7 are turned ON simultaneously and the IGN voltage is supplied to the terminals 8, 9 at the same time. In this state, the drive motor 1 does not operate.

After the electrodes 12*a*, 12*b* has a continuity therebetween, the water level rises further, water enters into the first chamber through chinks between the upper housing 14 and lower housing 15 and the driver IC is submerged. However, since the potentials of the terminals 8, 9 is fixed at the IGN voltage, the window never goes up or down arbitrarily.

Thus, according to this embodiment, since the housing for accommodating the submersion sensor has a plurality of holes in the bottom wall of the housing, the submersion sensor can detects the submersion of the vehicle before the printed board is submerged. In place of the holes provided in the bottom wall of the housing, the bottom wall may be abolished to allow water to come into the second chamber more swiftly.

Further, terminals not used for signal communication of the connector section 17 may be used for electrodes of the submersion sensor.

Figure 3:
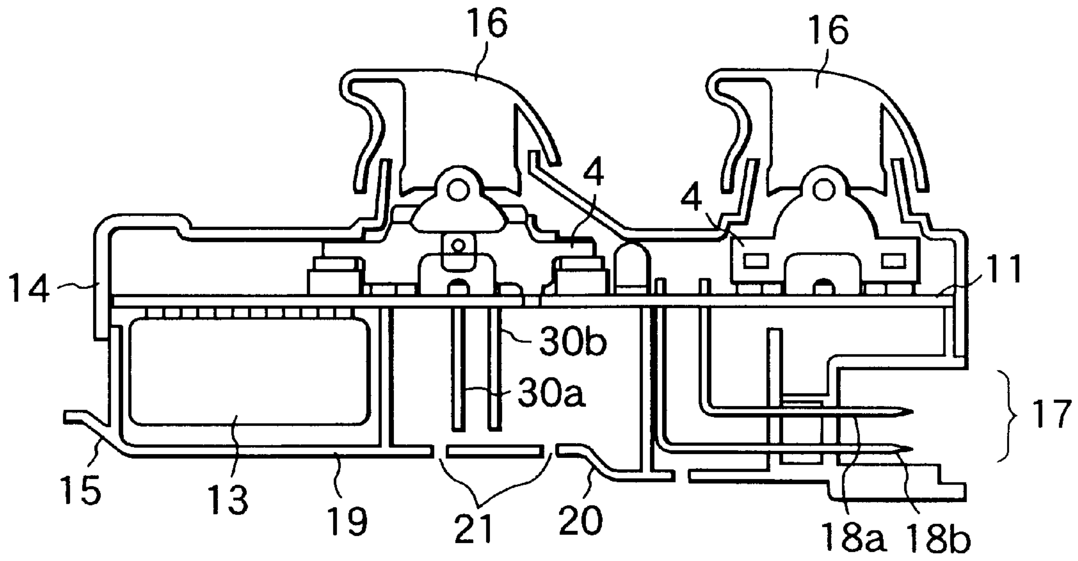
FIG. 3 is a cross sectional view showing a structure of a housing for accommodating a power window apparatus according to a second embodiment.

FIG. 3 is a sectional view showing a housing structure of a power window apparatus according to a second embodiment. In this embodiment, needle-shaped electrodes 30*a*, 30*b* are used in place of a pair of the electrodes 12*a*, 12*b* shown in FIG. 2. Theses needle-shaped electrodes 30*a*, 30*b* extend downwardly from the upper wall which is a part of the printed board 11 to the bottom wall 20 of the lower housing 15. Since the electrodes extend downwardly, when the water level rises from the lower part of the vehicle, the submersion of the vehicle can be detected sooner than the first embodiment.

Figure 4:
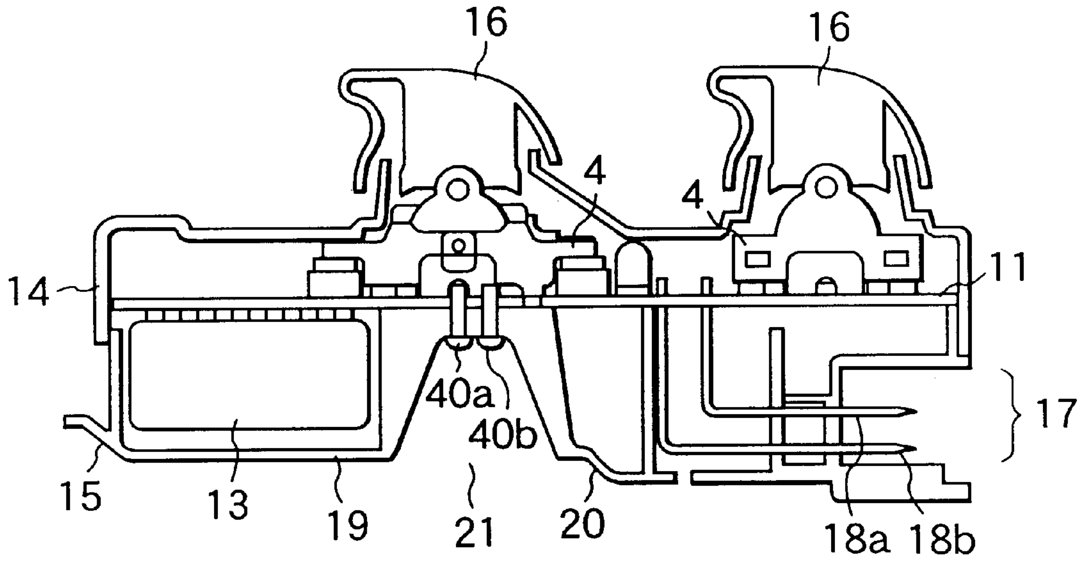
FIG. 4 is a cross sectional view showing a structure of a housing for accommodating a power window apparatus according to a third embodiment.

FIG. 4 is a sectional view showing a housing structure of a power window apparatus according to a third embodiment. In the third embodiment, screws 40*a*, 40*b* are used for tightening the lower housing 15 to the printed board 11 and also employed as electrodes of the submersion sensor. The interval of two screws 40*a*, 40*b* must be established at an appropriate distance so as to secure continuity when the vehicle is submerged. The advantage of this type of the housing structure is that no special electrodes are necessary and therefore the number of components can be reduced.

Figure 5:
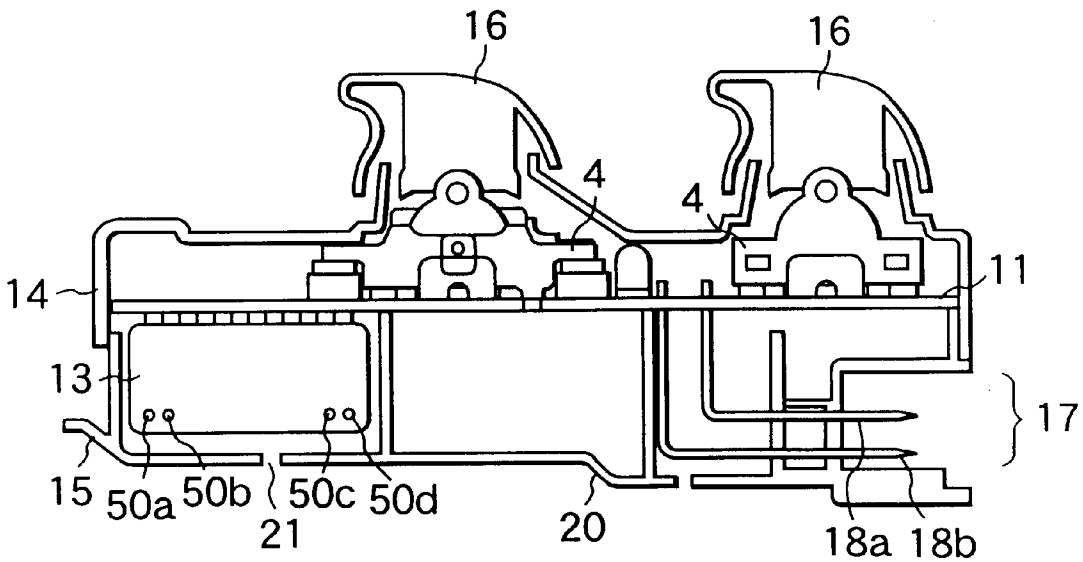
FIG. 5 is a cross sectional view showing a structure of a housing for accommodating a power window apparatus according to a fourth embodiment.

FIG. 5 is a sectional view showing a housing structure of a power window apparatus according to a fourth embodiment. In this embodiment, a control section and two submersion sensors are attached to the printed board 13. Two submersion sensors comprise two pair of electrodes, 50*a*, 50*b* and 50*c*, 50*d* and are disposed at the lower level than the control section so as to detect the submersion as soon as possible. This embodiment is advantageous in a stable performance of electrodes, that is, since the electrodes are directly formed on the board, this embodiment is free from such problems as fluctuation of electrode intervals or miscontact of electrodes due to vibrations. Another advantage of this embodiment is to be able to arrange relatively high water-resistant circuits on the printed board 13 and arrange relatively low water-resistant circuits on the printed board 11.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. A power window apparatus for a vehicle capable of switching an operation mode of a window to a submersion mode when a submersion of said vehicle is detected, comprising:

a circuit board having a circuit for controlling said window;

at least one sensor having a pair of conductive elements for detecting a continuity between said conductive elements when said conductive elements are submerged; and a housing for accommodating said circuit board and said sensor and for merging said sensor in water before said circuit board is submerged when said vehicle is submerged.

2. The power window apparatus according to claim 1, wherein said sensor is a pair of electrodes.

3. The power window apparatus according to claim 1, wherein said sensor is a pair of needle-shaped electrodes extending downwardly from the upper side to the lower side of said vehicle.

4. The power window apparatus according to claim 1, wherein said sensor is a pair of screws provided in said housing.

5. The power window apparatus according to claim 1, wherein said sensor is a pair of connector terminals of a connector section provided in said housing.

6. The power window apparatus according to claim 1, wherein said circuit board is provided at a position higher than said sensor.

7. The power window apparatus according to claim 1, further comprising:

a drive motor for driving said window;

a pair of up and down relays for controlling said motor so as to raise or lower said window; and a means for turning said both relays on simultaneously when said sensor detects said submersion.

8. A power window apparatus for vehicle capable of switching an operation mode of a window to a submersion mode when a submersion of said vehicle is detected, comprising:

a circuit board having a circuit for controlling said window;

at least one sensor having a pair of conductive elements for detecting a continuity between said conductive elements when said conductive elements is submerged;

a housing for accommodating said circuit board and said sensor;

a first chamber provided in said housing and enclosed by walls for accommodating said circuit board;

a second chamber provided in said housing and enclosed by walls for accommodating said sensor; and at least one opening provided at said walls of said second chamber for allowing to introduce water into said second chamber so as to merge said sensor in water before said circuit board is submerged.

9. The power window apparatus according to claim 8, wherein said opening is provided at a bottom wall among said walls of said second chamber.

10. The power window apparatus according to claim 8, wherein said sensor is a pair of electrodes.

11. The power window apparatus according to claim 8, wherein said sensor is a pair of needle-shaped electrodes extending downwardly from the upper side to the lower side of said vehicle.

12. The power window apparatus according to claim 8, wherein said sensor is a pair of screws provided in said housing.

13. The power window apparatus according to claim 8, wherein said sensor is a pair of connector terminals of a connector section provided in said housing.

14. The power window apparatus according to claim 8, further comprising:

a drive motor for driving said window;

a pair of up and down relays for controlling said motor so as to raise or lower said window; and a means for turning said both relays on simultaneously when said sensor detects said submersion.

15. A power window apparatus for a vehicle capable of switching an operation mode of a window to a submersion mode when a submersion of said vehicle is detected, comprising:

a control circuit for controlling said window;

at least one sensor having a pair of conductive elements for detecting a continuity between said conductive elements when said conductive elements are submerged; and a circuit board for mounting said control circuit and said sensor such that said sensor is provided at a position lower than said control circuit.

16. The power window apparatus according to claim 15, further comprising:

a drive motor for driving said window;

a pair of up and down relays for controlling said motor so as to raise or lower said window; and a means for turning said both relays on simultaneously when said sensor detects said submersion.

* * * * *